US012332608B2

(12) United States Patent
Lagorgette et al.

(10) Patent No.: US 12,332,608 B2
(45) Date of Patent: Jun. 17, 2025

(54) SYSTEM FOR SETTING A WATCH

(71) Applicant: ETA SA Manufacture Horlogère Suisse, Grenchen (CH)

(72) Inventors: Pascal Lagorgette, Bienne (CH); Xavier Stehlin, Cudrefin (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 469 days.

(21) Appl. No.: 17/744,846

(22) Filed: May 16, 2022

(65) Prior Publication Data

US 2022/0373978 A1 Nov. 24, 2022

(30) Foreign Application Priority Data

May 21, 2021 (EP) .................................... 21175377

(51) Int. Cl.
*G04R 20/26* (2013.01)

(52) U.S. Cl.
CPC .................................... *G04R 20/26* (2013.01)

(58) Field of Classification Search
CPC ........ G04R 20/26; G04R 60/06; G04R 60/08; G04R 60/10; G04R 60/12
See application file for complete search history.

(56) References Cited

U.S. PATENT DOCUMENTS 9,411,320 B1 * 8/2016 Liang ..................... G04G 17/02
2017/0003660 A1 * 1/2017 David .................... G04R 60/08
2017/0179580 A1 6/2017 Park et al.
2019/0049904 A1 * 2/2019 Lagorgette ............. G04R 20/26
2019/0294120 A1 * 9/2019 Nakajima .............. G04G 19/00
2020/0379411 A1 12/2020 Watanabe et al.

FOREIGN PATENT DOCUMENTS

| | | | |
|---|---|---|---|
| CH | 711 303 | A1 | 1/2017 |
| CH | 712 176 | A2 | 8/2017 |
| CH | 712 578 | B1 | 12/2017 |
| CN | 203365964 | U | 12/2013 |
| CN | 103995461 | A | 8/2014 |
| CN | 104199273 | A | 12/2014 |
| CN | 104679334 | A | 6/2015 |
| CN | 104777744 | A | 7/2015 |
| CN | 107219756 | A | 9/2017 |

(Continued)

OTHER PUBLICATIONS

Translation of WO2019007116, Espacenet (Year: 2019).*
European Search Report of European Patent Application No. 21 17 5377 dated Jan. 6, 2022.

*Primary Examiner* — Renee S Luebke
*Assistant Examiner* — Matthew Daniel Hwang
(74) *Attorney, Agent, or Firm* — Sughrue Mion, PLLC

(57) ABSTRACT

Provided is a system for setting an electronic watch, the system includes a portable electronic appliance provided with a near-field communication device and a microcontroller configured to control said device. The watch includes a near-field communication module and a microcontroller configured to exchange electric signals with this module, said watch and said appliance being configured to be connected, in the near field, with one another in order to carry out the setting operation for the watch.

13 Claims, 3 Drawing Sheets

(56) References Cited

FOREIGN PATENT DOCUMENTS

| | | | |
|---|---|---|---|
| CN | 107329397 | A | 11/2017 |
| CN | 107817677 | A | 3/2018 |
| CN | 108700848 | A | 10/2018 |
| CN | 218938783 | U | 4/2023 |
| EP | 3 211 491 | A1 | 8/2017 |
| KR | 10-1458748 | B1 | 11/2014 |
| WO | 2018/181467 | A1 | 10/2018 |
| WO | 2019/007116 | A1 | 1/2019 |

* cited by examiner

SYSTEM FOR SETTING A WATCH

CROSS REFERENCE TO RELATED APPLICATIONS

This application is claiming priority based on European Patent Application No. 21175377.7 filed on May 21, 2021, the disclosure of which is incorporated herein in its entirely by reference.

TECHNICAL FIELD OF THE INVENTION

The invention relates to a system for setting a watch, in particular an electronic watch, comprising a near-field communication module contributing to the setting of at least one function implemented by this watch.

The invention further relates to a method for setting this electronic watch.

TECHNOLOGICAL BACKGROUND

Electronic watches, such as so-called "smart" watches, have emerged in the watchmaking sector in recent years. Such a watch is conventionally set manually, in particular by activating push buttons, crowns and/or tactile keys, which is relatively inconvenient for the user or the after-sales service responsible for the setting operation. For example, if the watch has a perpetual calendar mechanism, the position of the analogue display elements of the perpetual calendar mechanism, and more generally the perpetual calendar mechanism, can be set by pulling on and/or rotating a crown of the watch and/or by pressing one or more push buttons of the watch. Thus, a type of year (for example a bissextile year) is selected, and the various display elements, and more generally all of the elements of the perpetual calendar mechanism, are positioned correctly. This method is not only tedious for the user, who has to correctly recall and execute all of the setting operations one after another, but it furthermore leads to risks of errors and discrepancies.

It is understood that there is a need to find a solution, in particular that overcomes the drawbacks of the prior art.

SUMMARY OF THE INVENTION

The purpose of the invention is to overcome these drawbacks by proposing a method and a system for setting a mechanism carrying out a clock function such as the perpetual calendar function of an electronic watch, which method is simple, robust and reliable.

For this purpose, the invention relates to an electronic watch provided with a case comprising at least one pair of horns, a horological movement and a near-field communication module capable of participating in the setting of at least one function implemented by said watch, said communication module is connected to the movement 6 by being arranged between the horns of said at least one pair of horns 5.

According to other embodiments:

- the case comprises a middle provided with a through-opening comprised between the horns of said at least one pair of horns, said opening being configured to receive all or part of the communication module;
- the communication module comprises a support element capable of closing off said opening;
- the communication module comprises a support element having a chip, at least one antenna and a connector intended to be electrically connected to a microcontroller of the horological movement;
- the communication module comprises a substrate attached to an internal face of a support element, said substrate comprising a chip, at least one antenna and a connector;
- the support element is made of at least one dielectric and/or electrically non-conducting material;
- said horological movement comprises a microcontroller configured to set said at least one function of the watch, in particular a clock function, by exchanging electric signals with said communication module;
- said communication module is connected in a removable manner to said horological movement.

Another aspect of the invention relates to a method for setting such an electronic watch, the watch comprising a near-field communication module and a microcontroller configured to exchange electric signals with this module, the method comprising the following steps of:

- establishing a near-field connection between an electronic appliance and the watch, the portable electronic appliance comprising a near-field communication device and a microcontroller configured to control said device;
- checking, by the microcontroller of the electronic appliance, the accuracy of a datum indicating the clock state of the watch;
- sending, to the near-field communication module of the watch, by the near-field communication device and when instructed to do so by the microcontroller of the electronic appliance, at least one watch setting instruction when the clock state datum is inaccurate;
- processing said at least one instruction received by means of the microcontroller of the watch, in order to generate watch setting parameters; and
- configuring the watch when instructed to do so by the microcontroller of the watch, according to the setting parameters generated.

Advantageously, in this method, the step of establishing a connection comprises a sub-step of initiating a connection, in particular an automatic connection, between the watch and the electronic appliance when this watch is located with respect to the electronic appliance at a distance that allows a connection to be established.

Another aspect of the invention relates to a system for setting such an electronic watch implementing this method, the system comprising a portable electronic appliance provided with a near-field communication device and a microcontroller configured to control said device, the watch comprising a near-field communication module and a microcontroller configured to exchange electric signals with this module, said watch and said appliance being configured to be connected, in the near field, with one another in order to carry out the setting operation for the watch.

DETAILED DESCRIPTION OF THE INVENTION

Figure 1:
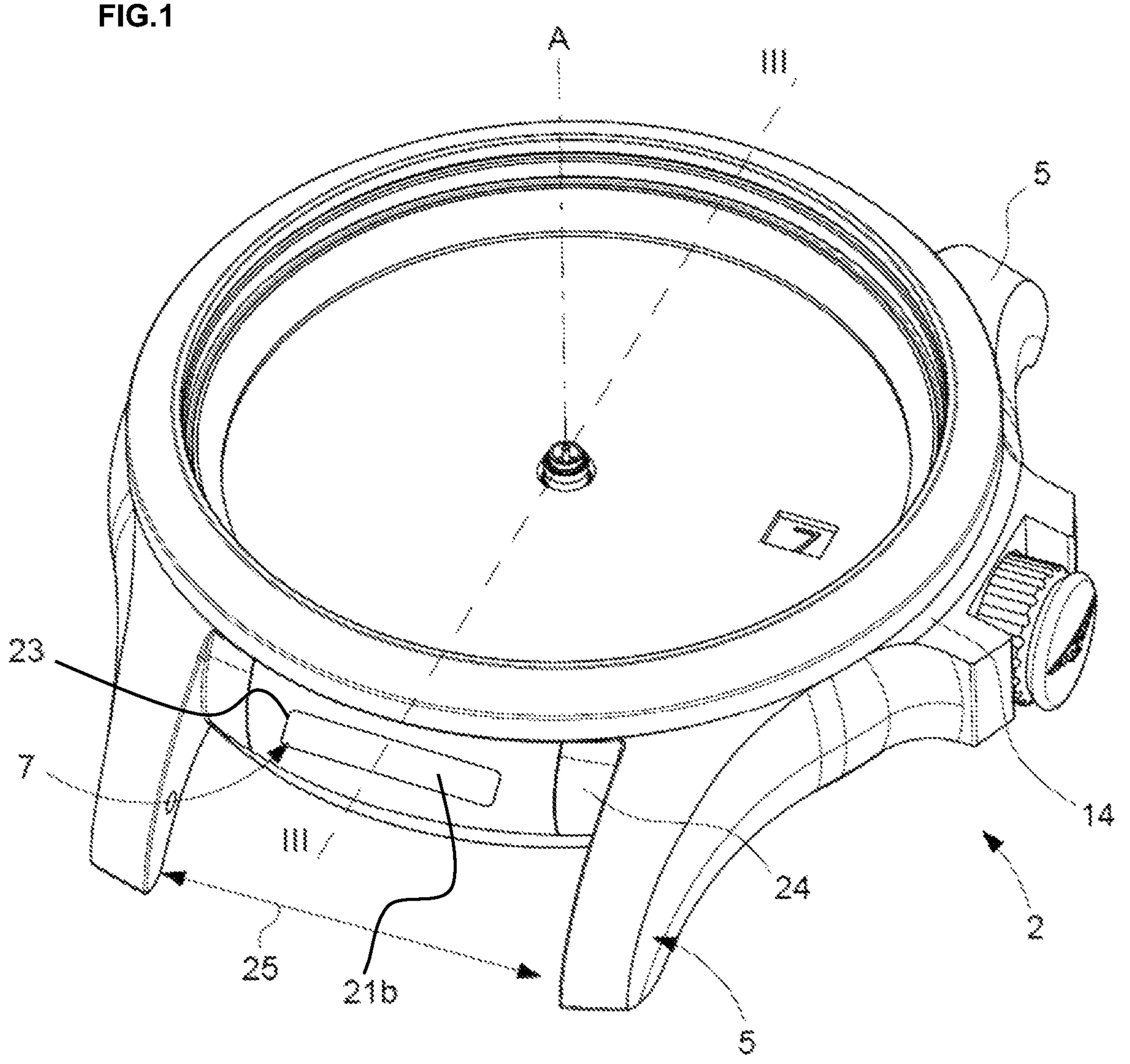
FIG. 1 is a perspective view of an electronic watch comprising a case provided with two pairs of horns, said case comprising a near-field communication module arranged between the horns of one of its two pairs according to one embodiment of this invention.

In FIGS. 1 to 6, an electronic watch 2 such as a quartz watch comprising a case 4, is shown. Such an electronic watch 2 is intended to be configured during a setting method described hereinbelow, in particular using a portable or mobile electronic appliance 3. This method is capable of setting a mechanism carrying out at least one function implemented by this watch 2. This function can be a clock function such as the perpetual calendar of a quartz watch 2. This clock function can further comprise the current date, day, month or year, or the current lunar phase, etc. Alternatively, it should be noted that these can be any other functions capable of being carried out by this watch 2.

The aforementioned method is implemented by a system 1 for setting the watch 2. This system 1 thus comprises the portable electronic appliance 3 in addition to said watch 2, both of which are capable of carrying out data exchanges 13 between one another by implementing a near-field communication technology.

In this context, the watch 2 thus comprises, in a non-limiting and non-exhaustive manner:

- the case 4 which is provided with at least one pair of horns 5;
- a near-field communication (NFC) module 7;
- a horological movement 6 such as an electronic movement comprising a microcontroller 8 configured to exchange electric signals with the near-field communication module 7;
- a regulating member such as a quartz oscillator for providing a time base to the microcontroller 8 and also for actuating a stepping motor, or a plurality thereof, to rotate time display hands and analogue display elements of a mechanism of the clock function of the watch 2 such as the perpetual calendar;
- a bracelet mounted on the case 4;
- an analogue and/or digital display thus comprising hands, in particular three display hands for respectively displaying the hours, minutes and seconds;
- a mechanism for implementing the clock function, such as a perpetual calendar mechanism;
- an input interface such as a touch-sensitive screen or even push buttons, or a crown, etc.
- a power supply unit such as a battery or accumulator to supply power to the horological movement 6 and in particular to the microcontroller 8 connected to the communication module 7.

In FIG. 1, the case 4 includes a middle 14 which can be made of metal (for example steel, preferably stainless steel), a synthetic material (for example a composite material comprising a polymer matrix filled with fibres, typically carbon fibres) or ceramic. The case 4 further comprises a back and a crystal which, together with the middle 14, contribute to forming an enclosure for this case 4. Such an enclosure is configured to house, in particular, the horological movement 6 comprising the microcontroller 8 and the near-field communication module 7. In FIG. 1, this middle 14 comprises two pairs of horns 5 to which a bracelet is intended to be secured in order for the watch 2 to be worn on the wrist.

Such a bracelet is preferably made of at least one dielectric and/or electrically non-conducting material for example a synthetic material (for example a composite material comprising a polymer matrix filled with fibres, typically carbon fibres), a ceramic material or a plastic material such as high-performance plastics. It should be noted that when the bracelet is made up of links, the links that are directly attached to the pairs of horns 5 are made of at least one dielectric and/or electrically non-conducting material, while the other links can be made of other various different materials. In this embodiment, the pairs of horns 5 are connected to an elastomer bracelet that closely fits the shape of the middle 14 in order to completely conceal an external face 21*b* of a support element 15 of the communication module 7, which will be described hereinbelow.

The middle 14 further comprises a through-opening 23 arranged between the horns of one of the two pairs of horns 5. This opening 23 is thus located in the interhorn space 25 defined between the pair of horns 5 located in the 6 o'clock position of the watch 2, but it can also be positioned in the interhorn space 25 between the pair of horns 5 located in the 12 o'clock position. This opening 23 is configured such that all or part of a body of a support element 15 of the communication module 7 passes therethrough. Moreover, it should be noted that if the pairs of horns 5 are disregarded, the middle 14 is rotationally symmetrical overall about a central axis A of the case 4.

In the present embodiment, wherein the clock function taken as an example relates to the perpetual calendar, it will be understood that the mechanism that implements it comprises a set of elements, including the date, day and month display elements. The display elements are preferably analogue display elements and comprise, for example, two hands to indicate the day and the month, and a disc to indicate the date. It is thus understood that these display elements allow the date, the day, the month and optionally the lunar phase to be indicated, while automatically taking into account the different lengths of the months and bissextile years. More specifically, a display element such as a hand is used to point to a date, day, month or lunar phase indication inscribed on the dial of the watch 2, or a display element such as a disc on which date, day, month or lunar phase indications are inscribed, one of these indications being positioned facing an aperture in the dial.

In the horological movement 6, the microcontroller 8 of this watch 2 is capable of controlling the mechanism implementing the clock function, in particular the means for positioning the elements of the perpetual calendar mechanism, in particular the display elements. The means for positioning the elements of the perpetual calendar mechanism advantageously comprise one or more stepping motors. The microcontroller 8 is furthermore connected to control means, or an input interface, which can be a crown, push pieces or touch-sensitive areas, which can be directly actuated by the wearer of the watch 2.

Inside the case 4 of this watch 2, the near-field communication module 7 is connected to the movement 6 by being arranged between the horns of said at least one pair of horns 5. Such a communication module 7 allows said watch 2 to be able to establish bidirectional communication with the portable or mobile electronic appliance 3.

More specifically, this communication module 7 is connected to the microcontroller 8 of this movement 6. In this configuration, the near-field communication module 7 is connected/linked, in a removable manner, to the microcontroller 8.

Such a near-field communication module 7 implements, for example, wireless short-range, high-frequency communication technologies of the NFC (Near Field Communication) type. This communication module 7 operates using technologies that are different from RFID and Bluetooth. This communication module 7 can, for example, operate in frequency bands at high frequencies HF for example at 13.56 MHz.

The communication module 7 thus allows for the exchange 13 of data when the watch 2 and the electronic appliance 3 are at a short distance from one another. Such a distance can be comprised between about 0 and 10 cm, and preferably between 0 and 5 cm. The communication module 7 of the watch 2 can be of the passive type with power supplied thereto by the radio frequencies transmitted by the communication device 12 of the electronic appliance 3. Alternatively, the communication module 7 of the watch 2 can be of the active type receiving power from the power supply unit of the watch 2.

Figure 2:
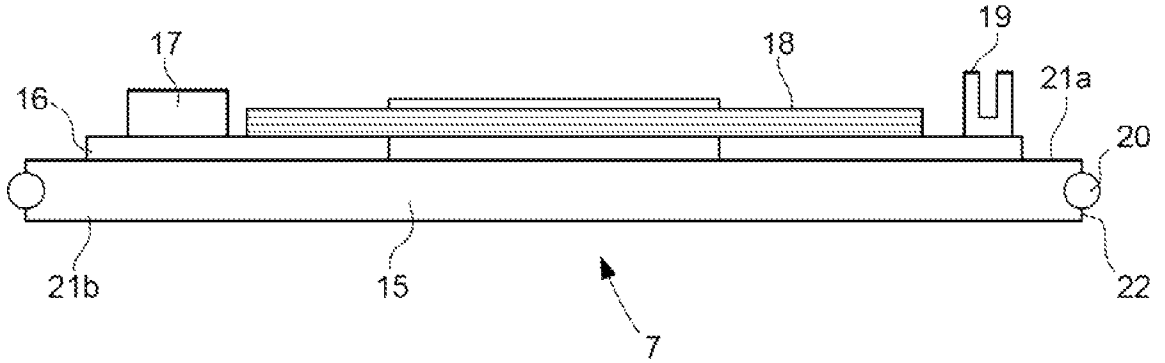
FIG. 2 is a diagrammatic view of the near-field communication module which is capable of participating in the setting of a function implemented by the watch, according to the embodiment of the invention.
Figure 3:
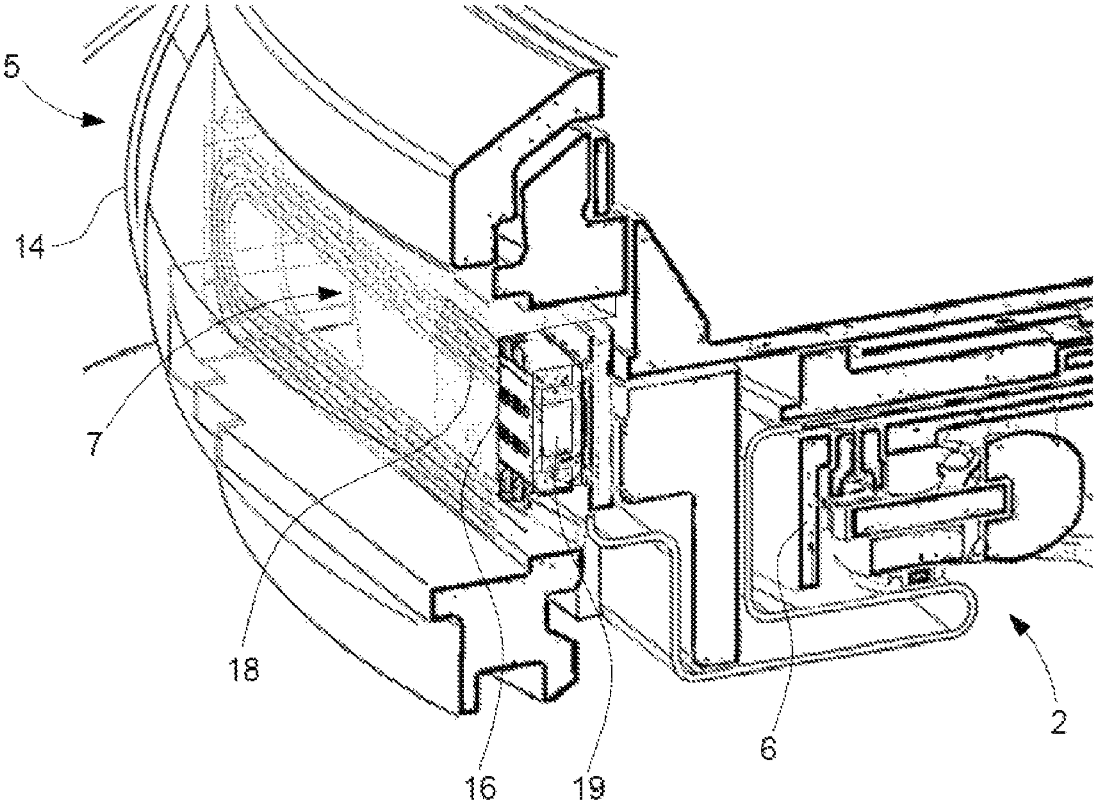
FIGS. 3 and 4 are partial, sectional views along the axis III-III shown in FIG. 1, which are presented respectively from two different angles, of a portion of the case wherein the communication module is arranged according to the embodiment of the invention.
Figure 4:
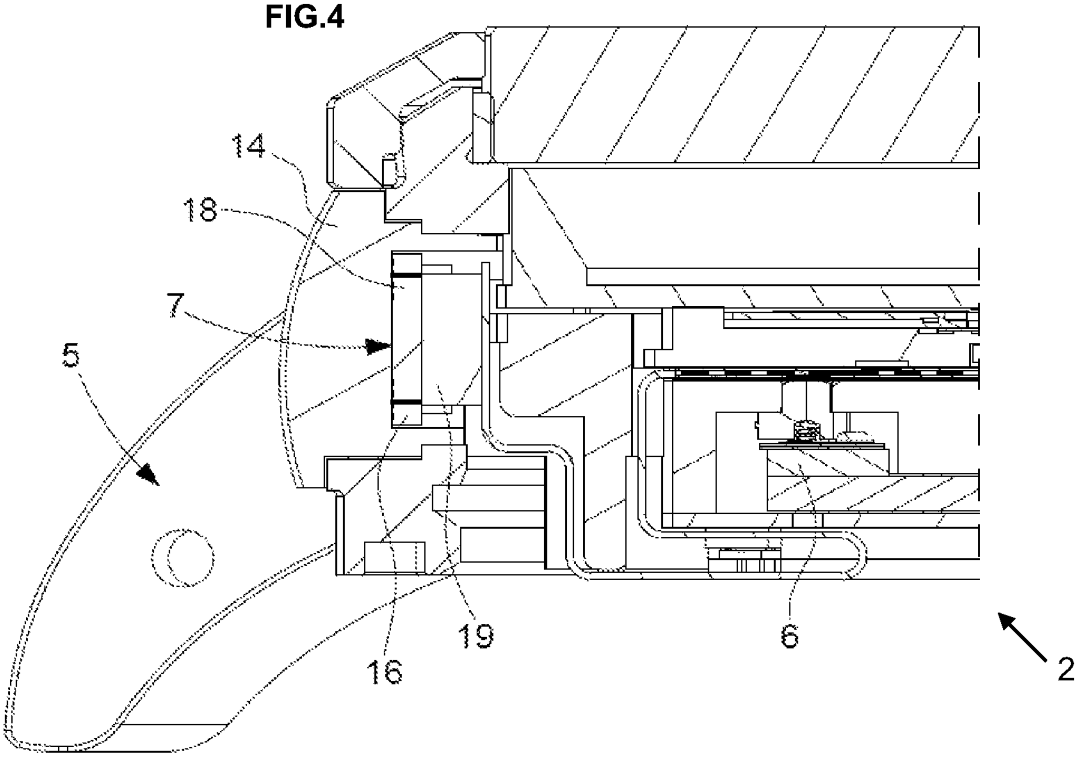

More specifically and with reference to FIG. 2, the near-field communication module 7 comprises an electronic chip 17, at least one antenna 18 and a connector 19 for connecting said module 7 to the microcontroller 8. The chip 17 that is connected to said at least one antenna 18 comprises hardware and software elements. In this context, the hardware and/or software elements of the chip 17 include at least one microprocessor cooperating with memory elements. The communication module 7 further comprises a substrate 16 which is advantageously produced in the form of a printed circuit board. Such a substrate 16, also referred to as a "support" or "plate", is preferably made of high-performance plastic material or laminated composites. This plastic material can be a polymer such as polyimide known by the trade name Kapton™ or a polyester. The chip 17 and the at least one antenna 18 as well as the connector 19 are attached to this substrate 16, for example by bonding.

Inside this communication module 7, the substrate 16 is attached to an internal face 21*a* of the aforementioned support element 15. In other words, this support element 15 comprises the substrate 16 and of course all the other components forming the communication module 7. This support element 15 has a shape that is appreciably similar to that of the opening 23 comprised in the middle 14 or strictly similar to that of this opening 23. Such an element 15 thus comprises the internal face 21*a* and an external face 21*b*, these two faces 21*a*, 21*b* being connected by a peripheral wall 22. Such a peripheral wall 22 comprises a cavity extending along the entire length of this wall 22 so as to help define the contour of this support element 15. This wall 22 further comprises a sealing element 20 with the middle 14 in order to prevent liquid ingress, such as an O-ring which is arranged within said cavity. Thus, the support element 15 closes off this opening 23 in the middle and can thus also be referred to as a "closure element".

This support element 15 has a thickness e which corresponds to the height or the width of this peripheral wall 22. This thickness e is substantially similar to or strictly similar to the thickness of the portion of the middle 14 comprising said opening 23. In other words, the opening 23 comprises an internal wall delimiting/defining the shape of this opening 23 and the thickness whereof is substantially similar to or strictly similar to the thickness e of the peripheral wall 22 of the support element 15.

This support element 15 is preferably made of at least one dielectric and/or electrically non-conducting material. This can be a synthetic material (for example made of a composite material comprising a polymer matrix filled with fibres, typically carbon fibres), a ceramic material or a plastic material such as high-performance plastics. It should be noted that the external face 21*b* of this support element 15 can be of the same colour as the external face 24 of the middle 14 and can further have a texture that is substantially similar to or strictly similar to this external face 24.

Furthermore, it should be noted that the arrangement described here of the communication module 7 between the two horns of a pair of horns 5 of the watch 2, contributes to improving the quality of the bidirectional near-field communication signal capable of being received or transmitted by this module 7.

Furthermore, in one embodiment, the communication module 7 of the watch 2 can comprise a magnetic shield element (not shown) between the chip 17 and said at least one antenna 18 of this module 7, and the movement 6 of the watch 2. This magnetic shield element improves the efficiency and sensitivity of the receipt/transmission of radio signals via the antenna 18 of the communication module 7 by isolating this antenna 18 from the metallic components of the watch 2 located in the immediate vicinity thereof. In other words, this magnetic shield element prevents any modification to the magnetic field emitted or received by the communication module 7, which modification would be the result of the presence of various metallic components of the watch 2 situated in the immediate vicinity of the communication module 7. Additionally, it is capable of reducing the negative influence that these metallic components can have on the performance levels of the communication module 7. This negative influence would consist of attenuating the magnetic field generated or received by this communication module 7.

Figure 5:
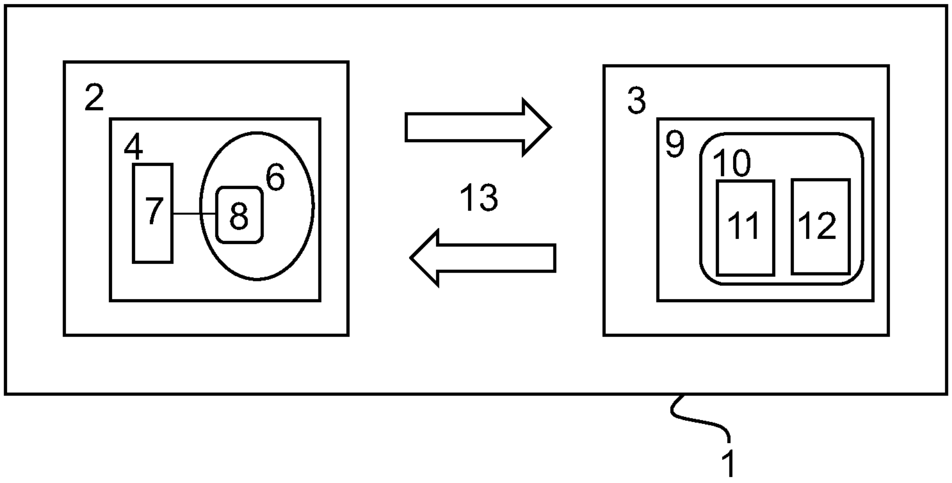
FIG. 5 is a diagrammatic view of a system for setting the electronic watch, according to the embodiment of the invention.

In the control system 1 shown in FIG. 5, the portable electronic appliance 3, also referred to as a user terminal, is an appliance capable of being carried and transported by a user. This is the case for a smartphone, a phablet or a tablet for example. It goes without saying that the appliances requiring a mains power supply, for example desktop computers, do not fall within the scope of this definition. Appliances such as, for example, a portable computer, to which a sensor is connected by a wireless or wired link, also do not fall within the scope of this definition. This electronic appliance 3 is used to transmit the setting parameters to the watch 2. This electronic appliance 3 comprises a case 9 in which an electronic circuit 10 is arranged. This electronic circuit 10 includes a microcontroller 11 and a near-field communication device 12, both of which are powered by a battery. The electronic appliance 3 can further comprise a camera and an input interface such as a touch-sensitive screen or even buttons. Moreover, the microcontroller 11 can include, in the memory elements thereof, an optical recognition algorithm to contribute to detecting information in particular displayed on the dial of the watch 2 from an operation for processing data originating from the camera. It should be noted that the communication device 12 of this appliance 3 is configured to connect to and to exchange 13 data with the near-field communication module 7 of the watch 2.

Figure 6:
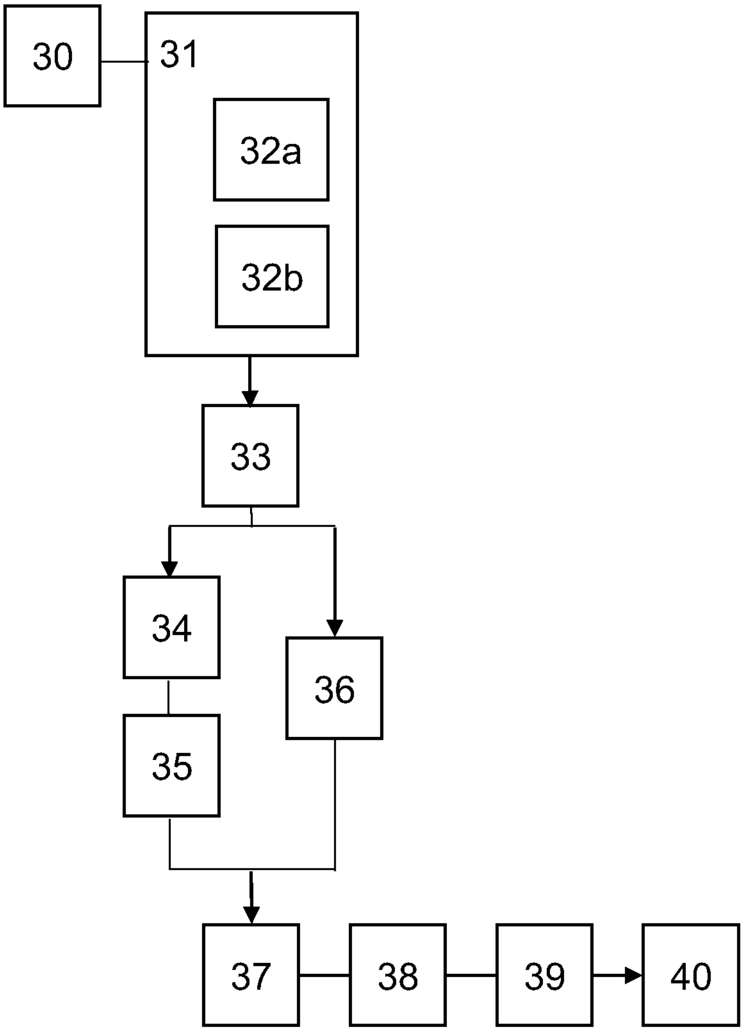
FIG. 6 is a flow chart regarding the method for setting an electronic watch, according to the embodiment of the invention.

With reference to FIG. 6, the invention further relates to a method for setting the watch 2. Such a method is implemented by the setting system 1 comprising in particular the electronic appliance 3 and the watch 2. It allows at least one function of the watch 2 to be set, such as a clock function carried out by a mechanism for implementing such a function of this watch 2 such as the perpetual calendar mechanism for example. This perpetual calendar mechanism allows, among other things, the display elements that compose it to be positioned. In the context of setting this perpetual calendar mechanism, this can be referred to as a method for setting a perpetual calendar mechanism of the quartz watch 2.

This method comprises a step 30 of establishing a near-field connection between the electronic appliance 3 and the watch 2. The term "near field" is understood herein to mean that the connection is made using NFC (Near Field Communication) technology and insofar as the distance separating the electronic appliance 3 from the watch 2 is comprised between 0 and 10 cm, preferably between 0 and 5 cm.

Then, this step 30 of establishing a connection comprises a sub-step 31, which is in particular automatic, of initiating a connection between the watch 2 and the electronic appliance 3 when this watch 2 is located with respect to the electronic appliance 3 at a distance allowing a near-field connection to be established. In other words, such a sub-step 31 can be initiated manually or automatically.

When this sub-step 31 is carried out manually, it is referred to as a sub-step 32*a* of manually initiating a connection between the watch 2 and the electronic appliance 3 when this watch 2 is located with respect to the electronic appliance 3 at a distance allowing a near-field connection to be established. In this context, the watch 2 and the electronic appliance 3 are arranged relative to one another at a distance that allows a near-field connection to be established. Then, the communication module 7 of the watch 2 initiates a connection process with the communication device 12 of the electronic appliance 3, or the communication device 12 of the electronic appliance 3 initiates this connection process with the communication module 7 of the watch 2, after an interaction, depending on the case, between the user and an input interface of the watch 2, or between the user and an input interface of the electronic appliance 3.

When this sub-step 31 is carried out automatically, simply positioning the watch 2 relative to the electronic appliance 3 at a distance allowing a near-field connection to be established is sufficient to initiate the connection process between the communication module 7 of the watch 2 and the communication device 12 of the electronic appliance 3. In this context, this is referred to as a sub-step 32*b* of automatically initiating a connection between the watch 2 and the electronic appliance 3 when this watch 2 is located with respect to the electronic appliance 3 at a distance allowing a connection to be established. In this configuration, this sub-step 32*b* thus contributes to establishing an automatic connection, without requiring the user to perform any actions on the watch 2 or the electronic appliance 3, between this watch 2 and the electronic appliance 3 in addition to automatically setting the clock functions of this watch 2 in a transparent manner for this user of said watch 2. It should be noted that this sub-step 32*b* can comprise an authentication phase taking place between the communication device 12 and module which is transparent for the user. In other words, such an authentication phase does not require the user to perform any actions. In this context, authentication elements are included in the memory elements of the communication device 12 and module.

Once the connection has been established between the watch 2 and the electronic appliance 3, the method comprises a step 33 of checking, by the microcontroller 11 of the electronic appliance 3, the accuracy of a datum indicating the clock state of the watch 2. Such a clock state datum is a datum that represents an at least partial setting state of the watch 2. It can, for example, be a time zone, a country code, an alarm, a geographic location, a date, a tide, a solar phase and/or a lunar phase, a UTC time, etc. set on the watch 2. In the case that the method aims to set said perpetual calendar mechanism, the state datum can pertain to the current date, day, month or year (or even the current lunar phase if the perpetual calendar mechanism comprises an element for displaying the lunar phase, for example a datum regarding the geographic location, the hemisphere, the country code, etc.), said state datum representing a current setting state of the perpetual calendar mechanism, for example a position of a display element of said mechanism.

Such a check step 33 comprises a sub-step 34 of transmitting, to the communication module 7 of the watch 2, by the near-field communication device 12 and when instructed to do so by the microcontroller 11 of the electronic appliance 3 controlling said communication device 12, an instruction for retrieving the datum indicating the clock state of the watch 2. During this sub-step 34, a signal regarding said instruction is thus generated by the microcontroller 11 to be transmitted to this communication device 12. The communication device 12 then transmits this instruction to the communication module 7 of the watch 2.

Then, the check step 33 comprises, after the watch 2 receives this instruction, a sub-step 35 of sending, to the electronic appliance 3, by the near-field communication module 7 when instructed to do so by the microcontroller 8 of the watch 2, the clock state datum characterising a current setting of the watch 2 corresponding to current setting parameters of this watch 2. During this sub-step 35, the microcontroller 8 determines the clock state datum characterising a current setting of a mechanism relative to a clock function such as the perpetual calendar. In the context of the perpetual calendar, the state datum relates to the current date, day, month and year (and optionally to the current lunar phase if the perpetual calendar mechanism comprises an element for displaying the lunar phase, for example data regarding a geographical location, a hemisphere or a country code, etc.). This state datum is sufficient to represent a current setting state of the perpetual calendar mechanism, in particular the position of the display elements of said mechanism. The microcontroller 8 then generates a signal comprising this clock state datum which is transmitted to the communication module 7. The communication module 7 of the watch 2 then sends said state datum to the communication device 12.

In an alternative embodiment of this transmitting sub-step 34 and sending sub-step 35, the check step 33 can provide for a sub-step 36 of determining the clock state datum from a process involving reading a dial of the watch 2, carried out by the electronic appliance 3 comprising the camera and an optical recognition algorithm executed by the microcontroller 11 of the electronic appliance 3. Such a sub-step 36 thus comprises a phase designed to place the dial of the watch 2 and the camera of the electronic appliance 3 such that they face one another. The term "face one another" is understood to mean that the dial and the camera are positioned relative to one another and at a distance from one another such that the hands of the time display lie within the image capture field of the camera. This sub-step 36 then comprises a phase of detecting information characterising a current setting of the watch 2, which is displayed on the dial of this watch 2, by means of the camera and the optical recognition algorithm of the electronic appliance 3. This sub-step 36 then comprises a phase of estimating the clock state datum based on the information detected. This state datum can, in this case, further characterise a current setting of the perpetual calendar mechanism.

The check step 33 then comprises a sub-step 37 of comparing the state data with setting parameters, in order to check that the setting of the perpetual calendar mechanism is correct. These setting parameters are, for example, retrieved on a regular basis or upon request, over an Internet network, from the electronic appliance 3. The term "setting parameter" is understood to mean any parameter allowing the watch 2 to be at least partially set. It can be, for example, information concerning a date as shown, but also information that could concern a time zone, a country code, an alarm, a geographical location, a date, a tide, a solar phase and/or a lunar phase, or a UTC time, etc. It should be noted that when this is a setting parameter of the perpetual calendar mechanism, this is understood to mean information regarding the current date, day, month and year (and optionally the current lunar phase if the perpetual calendar mechanism comprises an element for displaying the lunar phase, this data thus being, for example, a geographical location, a hemisphere, or a country code, etc.), this information being sufficient to correctly set the perpetual calendar mechanism of the watch 2, in particular the position of the display elements of this mechanism.

The method then comprises a step 38 of sending at least one setting instruction to the near-field communication module 7 of the watch 2. This setting instruction is sent by the near-field communication device 12 when instructed to do so by the microcontroller 11 of the electronic appliance 3, as soon as the clock state datum is identified/estimated to be inaccurate. During this step 38, a control signal regarding said setting instruction is generated by the microcontroller 11 and then transmitted to the communication device 12 of the electronic appliance 3. This control signal is such that it corresponds to a coding of setting parameters of the perpetual calendar mechanism, i.e. a coding of a set of data relative to the current date, day, month and year (and also to the lunar phase where appropriate). As stated hereinabove, such setting parameters are, for example, retrieved on a regular basis or upon request, over an Internet network, from the electronic appliance 3. It should be noted that, in order to perform the coding, a dedicated application installed on the electronic appliance 3 is advantageously used. If the electronic appliance 3 is a smartphone or a tablet, this application is advantageously capable of generating the coding from the date, day, month, year and geographical location provided by the electronic appliance 3. This setting instruction is then transmitted by the communication device 12 to the communication module 7 of the watch 2.

The method then comprises a step 39 of processing said at least one instruction received by means of the microcontroller 8 of the watch 2, in order to generate setting parameters for the watch 2. During this step 39, the microcontroller 8 processes said instruction to obtain the current perpetual date.

The method then includes a step 40 of configuring the watch 2 when instructed to do so by the microcontroller 8 of the watch 2, according to the setting parameters generated. This step 40 comprises a sub-step of actuating means for positioning the elements of the perpetual calendar mechanism so as to place said elements in a position that corresponds to the setting parameters obtained during the processing step 39.

It is understood that various modifications and/or improvements and/or combinations that would be obvious to a person skilled in the art can be made to the embodiment of the invention described hereinabove, while still remaining within the scope of the invention as defined by the accompanying claims. For example, the check step 33 could be omitted, with the user converting the position of the time display hands into workable data.

Moreover, although the description describes the setting and check of the setting of a perpetual calendar mechanism, other settings could alternatively be carried out, for example setting a time zone, a time, or tides etc. Moreover, this set information is not necessarily displayed on the watch 2 in an analogue manner (in particular by hands or discs), but can be displayed in a digital manner on the dial: the configuration step 40 thus does not necessarily include activating means for displacing analogue display elements.

The invention claimed is:

1. Electronic watch (2) provided with a case (4) comprising at least one pair of horns (5), a horological movement (6) and a near-field communication module (7) capable of participating in the setting of at least one function implemented by said watch (2), said communication module (7) is connected to the movement (6) by being arranged in a through-opening (23) between the horns of said at least one pair of horns (5), and wherein the communication module (7) comprises a substrate (16) on which a chip (17) and at least one antenna (18) are mounted, and the communication module (7), with the substrate (16) and the chip (17) and the at least one antenna (18) mounted thereon, fits through the through-opening (23).

2. Electronic watch (2) according to claim 1, wherein the case (4) comprises a middle (14) provided with the through-opening (23) comprised between the horns of said at least one pair of horns (5), said through-opening (23) being configured to receive all or part of the communication module (7).

3. Electronic watch (2) according to claim 1, wherein said communication module (7) comprises a support element (15) capable of closing off said through-opening (23).

4. Electronic watch (2) according to claim 1, wherein the communication module (7) comprises a support element (15) including the chip (17), the at least one antenna (18) and a connector (19) intended to be electrically connected to a microcontroller (8) of the horological movement (6).

5. Electronic watch (2) according to claim 4, wherein the substrate (16) and the support element (15) are both rectangular, and the support element (15) is larger than the substrate (16).

6. Electronic watch (2) according to claim 5, wherein, among the substrate (16), the chip (17), and the at least one antenna (18), the communication module (7) fits through the through-opening (23) in an orientation of the substrate (16) last after the chip (17) and at least one antenna (18) and is held in that orientation inside of the through-opening (23) by the support element (15).

7. Electronic watch (2) according to claim 1, wherein the communication module (7) comprises the substrate (16) being attached to an internal face (21*a*) of a support element (15), the substrate (16) comprising the chip (17), the at least one antenna (18) and a connector (19).

8. Electronic watch (2) according to claim 7, wherein the support element (15) is made of at least one dielectric and/or electrically non-conducting material.

9. Electronic watch (2) according to claim 1, wherein said horological movement (6) comprises a microcontroller (8) configured to set said at least one function of the watch, the at least one function being a clock function, by exchanging electric signals with said communication module (7).

10. Electronic watch (2) according to claim 1, wherein said communication module (7) is connected in a removable manner to said horological movement (6).

11. Method for setting an electronic watch (2) according to claim 1, the watch (2) comprising the near-field communication module (7) and a microcontroller (8) configured to exchange electric signals with this module (7), the method comprising the following steps of:

establishing (30) a near-field connection between a portable electronic appliance (3) and the watch (2), the portable electronic appliance (3) comprising a near-field communication device (12) and a microcontroller (11) configured to control said device (12);

checking (33), by the microcontroller (11) of the electronic appliance (3), the accuracy of a datum indicating the clock state of the watch (2);

sending (35), to the near-field communication module (7) of the watch (2), by the near-field communication device (12) and when instructed to do so by the microcontroller (11) of the electronic appliance (3), at least one instruction for setting the watch (2) when the clock state datum is inaccurate;

processing (39) said at least one instruction received by means of the microcontroller (8) of the watch (2), in order to generate parameters for setting the watch (2); and configuring (40) the watch (2) when instructed to do so by the microcontroller (8) of the watch (2), according to the setting parameters generated.

12. Setting method according to claim 11, wherein the step (30) of establishing a connection comprises a sub-step (31) of initiating an automatic connection, between the watch and the electronic appliance (3) when this watch is located with respect to the electronic appliance (3) at a distance that allows a connection to be established.

13. System (1) implementing the method according to claim 11, the system comprising the electronic watch (2) and the portable electronic appliance (3).

* * * * *